(12) United States Patent
Hagen

(10) Patent No.: US 8,960,162 B2
(45) Date of Patent: Feb. 24, 2015

(54) FILTER MEANS, MOTOR VEHICLE, AND METHOD FOR OPERATING FILTER MEANS

(75) Inventor: Harald Hagen, Creussen (DE)

(73) Assignee: Audi AG, Ingolstadt (DE)

( * ) Notice: Subject to any disclaimer, the term of this patent is extended or adjusted under 35 U.S.C. 154(b) by 1150 days.

(21) Appl. No.: 12/894,399

(22) Filed: Sep. 30, 2010

(65) Prior Publication Data

US 2011/0079738 A1 Apr. 7, 2011

(30) Foreign Application Priority Data

Oct. 2, 2009 (DE) .......................... 10 2009 048 134

(51) Int. Cl.
*F02M 33/02* (2006.01)
*F02G 5/00* (2006.01)
*F02M 25/08* (2006.01)
*B01D 53/04* (2006.01)

(52) U.S. Cl.
CPC ....... *F02M 25/0854* (2013.01); *B01D 53/0438* (2013.01); *F02M 25/0836* (2013.01); *B01D 2259/4516* (2013.01)
USPC .......................................... 123/519; 123/543

(58) Field of Classification Search
CPC ............................... F02M 25/08; B01D 53/02
USPC ..................... 96/108; 123/516–520, 543–549
See application file for complete search history.

(56) References Cited

U.S. PATENT DOCUMENTS

| 3,601,110 | A | * | 8/1971 | Kamazuka ............... 123/179.15 |
| 4,872,439 | A | * | 10/1989 | Sonoda et al. ............... 123/519 |
| 4,951,643 | A | * | 8/1990 | Sato et al. ..................... 123/520 |
| 6,102,364 | A | | 8/2000 | Busato |
| 6,343,591 | B1 | | 2/2002 | Hara et al. |
| 6,514,326 | B1 | | 2/2003 | Hara et al. |
| 7,228,851 | B2 | * | 6/2007 | Nakamura et al. ............ 123/519 |
| 2001/0017129 | A1 | * | 8/2001 | Sugimoto et al. ............ 123/519 |
| 2002/0046739 | A1 | * | 4/2002 | Okada et al. .................. 123/518 |
| 2002/0174857 | A1 | * | 11/2002 | Reddy et al. .................. 123/520 |
| 2003/0140901 | A1 | * | 7/2003 | Amano et al. ................ 123/520 |
| 2004/0030487 | A1 | * | 2/2004 | Streib .......................... 701/114 |
| 2004/0094132 | A1 | * | 5/2004 | Fujimoto et al. ............. 123/519 |
| 2005/0022796 | A1 | * | 2/2005 | Zuchara ....................... 123/519 |

FOREIGN PATENT DOCUMENTS

DE 3609976 A1 10/1986
DE 10116693 A1 10/2002

* cited by examiner

*Primary Examiner* — Mahmoud Gimie
*Assistant Examiner* — Sizo Vilakazi
(74) *Attorney, Agent, or Firm* — Novak Druce Connolly Bove + Quigg LLP

(57) ABSTRACT

The invention relates to an activated charcoal filter (10) for storing and releasing gaseous hydrocarbons which originate from a fuel supply means of a motor vehicle. The activated charcoal (14) can be supplied with gaseous hydrocarbons via an inlet (16). A heating means for heating of the activated charcoal (14) is made available by a tank shutoff valve (18) by means of which the inlet (16) can be shut off. Since the tank shutoff valve (18) is being operated as a heating means, an additional heating means for regenerating the activated charcoal (14) can be omitted. Furthermore, the invention relates to a motor vehicle with such an activated charcoal filter (10) and a method for operating an activated charcoal filter (10).

8 Claims, 2 Drawing Sheets

FILTER MEANS, MOTOR VEHICLE, AND METHOD FOR OPERATING FILTER MEANS

Figure 1:
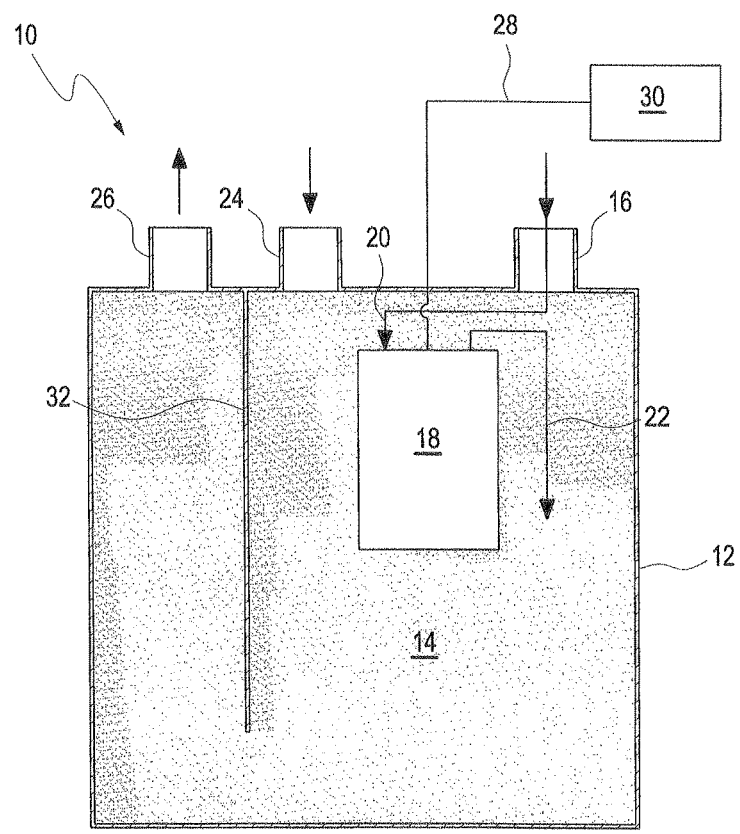

The invention relates to a filter means for storing and releasing gaseous hydrocarbons. The filter means has an inlet via which a storage medium can be supplied with gaseous hydrocarbons originating from a fuel supply means of a motor vehicle. The filter means comprises at least one heating means for heating the storage medium. Furthermore, the invention relates to a motor vehicle with such a filter means and a method for operating a filter means.

DE 36 09 976 C2 describes an activated charcoal filter for a motor vehicle that is used to capture gaseous hydrocarbons. On a bottom of the activated charcoal filter, there is a cover with an opening as a fresh air inlet. A heating means which can be supplied with electrical current from the vehicle electrical system is located downstream of the fresh air inlet. Fresh air entering the activated charcoal filter and the activated charcoal located above the heating means are heated in this way. This provides for an improved discharge of the gaseous hydrocarbons which have been adsorbed on the activated charcoal when the activated charcoal filter is being regenerated.

Such a heating means is comparatively complex and increases the amount of installation space required for the activated charcoal filter.

U.S. Pat. No. 6,514,326 B1 describes an activated charcoal filter with a left chamber and a right chamber, which are each filled with activated charcoal. Valves, filters, and similar peripheral parts of the activated charcoal filter are housed in a laterally open intermediate space between the two chambers to save installation space. The parts housed in the intermediate space are used to remove adsorption heat from the chambers.

The object of this invention is to devise a filter means of the initially named type which enables improved regeneration of the storage medium.

This object is achieved by a filter means with the features of claim 1, by a motor vehicle with the features of claim 7, and by a method with the features of claim 9. Advantageous configurations with advantageous developments of the invention are cited in the dependent claims.

In the filter means according to the invention, at least one heating means for heating the storage medium is made available by a shutoff means for shutting off the inlet. That is, the shutoff means can be operated such that exhaust heat released during operation penetrates into the storage medium. Since the storage medium which has been purged by the regeneration air more easily again releases the previously stored gaseous hydrocarbons when the storage medium is heated, improved regeneration of the storage medium can be achieved as a result. Especially slow aging of the storage medium can also be accomplished by the improved regeneration of the storage medium.

When there is already a shutoff means which is designed for shutting off the inlet on the filter means, by using just this shutoff means as a heating means an especially simple design of the filter means can be achieved since there need not be a separate heating means. Omitting a separate heating means for heating of the storage medium also ensures a reduced installation space requirement and moreover a saving of energy.

The shutoff means is especially a conventional component of the filter means when the latter is coupled to a pressure tank which can be designed as a steel tank for negative pressures down to −100 mbar and for overpressures of up to 300 mbar or as a low pressure plastic tank for negative pressures down to −90 mbar and for overpressures of up to 90 mbar. The shutoff means can, however, also be used in a filter means for a pressure tank or low pressure tank which is designed for pressures other than those named above by way of example. By providing the shutoff means which can be used as a heating means, the filter means can be used especially well in particular in conjunction with a low pressure tank.

By heating the storage medium, moreover, emissions of gaseous hydrocarbons from the filter means can be reduced; this is advantageous in light of the increasingly strict requirements as regards emission boundary values to be observed. Moreover, the shutoff means is notably less susceptible to failure and particularly reliable.

In one advantageous configuration of the invention, the filter means has a receiving space in which the shutoff means is embedded in the storage medium at least in certain sections. The shutoff means in this case can be surrounded by the storage medium in at least two directions which lie in one plane on either side or, for an essentially cylindrical shutoff means, on the outer peripheral side so that there is especially good heat transfer from the shutoff means operated as a heating means to the storage medium which is to be heated.

It has also been shown to be advantageous if the shutoff means is located downstream of the inlet. The possible result is especially that the shutoff means is completely surrounded by the storage medium, as a result of which especially effective heat transfer to the storage medium is enabled. Moreover, the storage medium with the shutoff means integrated into it can thus be produced as a unit which already has at least one line leading from the inlet to the shutoff means and at least one outlet discharging from the shutoff means into the storage medium.

In addition or alternatively, it can be provided that the filter means has a receiving space into which the shutoff means can be reversibly placed at least in certain sections. In this version of the filter means, the shutoff means is preferably designed as a module which can be especially easily replaced in the event of a defect. A connecting line for connecting the shutoff means to the inlet can be located inside or outside the filter means here.

In another advantageous configuration of the invention, the shutoff means is designed as a valve which can be electromagnetically actuated. This electromagnetically actuatable valve is characterized by especially high heat evolution when the actuating magnet is supplied with electrical current. In the de-energized state the valve can be closed and then can act as a heating means in the energized opened state, or it can be closed in the energized state and can open when de-energized. When the valve is designed as a bistable valve, energizing ensures a change of the switching state in which the valve remains even if it is no longer being supplied with electrical current. In this connection energizing the actuating magnet can be used as a means for releasing heat energy during both opening and closing.

According to another aspect of the invention, the aforementioned object is achieved by a motor vehicle with a filter means according to the invention. In this connection the motor vehicle preferably has means for supplying to the electromagnetically actuatable shutoff means a switching signal whose frequency is higher than a frequency which is suitable for changing a switching state of the shutoff means. Here, the supplying of the high frequency switching signal to the shutoff means can be used to simply heat the shutoff means without the switching state of the shutoff means changing. This supplying of the high frequency switching signal to the shutoff means can be done especially easily by pulse width modulation.

According to another aspect of the invention, the aforementioned object is achieved by a method for operating a filter means in which the filter means stores gaseous hydrocarbons by a storage medium being supplied with gaseous hydrocarbons originating from a fuel supply means of a motor vehicle via an inlet. The storage medium is heated by means of at least one heating means, with a shutoff means designed to block the inlet being operated as a heating means for heating of the storage medium.

The preferred advantages and embodiments which are described for the filter means according to the invention also apply to the motor vehicle according to the invention and the method according to the invention for operating a filter means.

The features and combinations of features which are named above in the specification as well as the features and combinations of features which are named below in the description of the figures and/or which are shown only in the figures can be used not only in the respectively indicated combination, but also in other combinations or alone, without departing from the framework of the invention.

Other advantages, features, and details of the invention will become apparent from the claims, the following description of preferred embodiments, as well as using the drawings.

Figure 2:
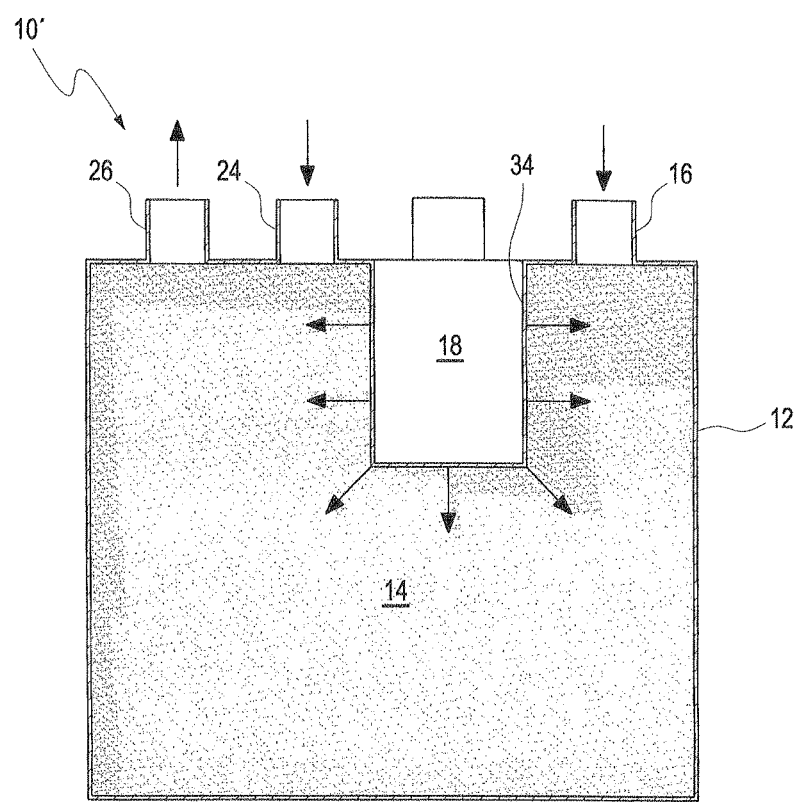

FIG. 1 schematically shows an activated charcoal filter for storing gaseous hydrocarbons from a fuel supply means of a motor vehicle into which a tank shutoff valve is integrated; and FIG. 2 schematically shows another option of arranging the tank shutoff valve on an activated charcoal filter.

An activated charcoal filter 10 is used to store gaseous hydrocarbons from a fuel supply means (not shown) of a motor vehicle. The activated charcoal filter 10 comprises a tank 12 in which there is activated charcoal 14. Gaseous hydrocarbons originating from the fuel tank are delivered via an inlet 16 to the activated charcoal 14. A tank shutoff valve 18 is located downstream of the inlet 16 and is completely surrounded by the activated charcoal 14 (cf. FIG. 1). An inlet line 20 which couples the tank shutoff valve 18 to the inlet 16 runs likewise within the tank 12. An outlet line 22 of the tank shutoff valve 18 discharges into the activated charcoal 14. In order to enable the gaseous hydrocarbons to reach the activated charcoal 14, the tank shutoff valve 18 is opened.

When the activated charcoal 14 is loaded with gaseous hydrocarbons, fresh air is delivered via a purging air inlet 24 to the activated charcoal 14, which is then—and loaded with gaseous hydrocarbons—supplied via an outlet 26 to an intake pipe of the internal combustion engine of the motor vehicle. In this way the activated charcoal 14 is regenerated.

To improve the regeneration of the activated charcoal 14, the tank shutoff valve 18 is operated as a heating means here. An actuating magnet of the electromagnetically actuatable tank shutoff valve 18 is supplied with electrical current via a control line 28 for this purpose. The evolution of heat of the actuating magnet heats the activated charcoal 14 and the purging air which is entering the tank 12 via the purging air inlet 24. In this way the activated charcoal 14 can be regenerated especially quickly and to an especially great extent.

By means of a control device 30 which is coupled to the control line 28, for example, by pulse width modulation, the tank shutoff valve 18 can be supplied with a high frequency switching signal which is not sufficient to change the operating state of the tank shutoff valve 18. If the tank shutoff valve 18 is therefore in a closed or opened state, it remains in this state but releases exhaust heat in spite of the fact that the actuating magnet is energized with the high frequency switching signal.

A deflection wall 32 within the tank 12 provides for the purging air to flow through the activated charcoal 14 along an especially long flow path during regeneration before it is supplied to the internal combustion engine of the motor vehicle via the outlet 26.

To enlarge an outer surface area of the tank shutoff valve 18 and thus to ensure improved heat transfer to the activated charcoal 14, the tank shutoff valve 18 (not shown) can have heat transfer fins or similar projections which protrude from a base body of the tank shutoff valve 18.

On a line (not shown) from the outlet 26 to the intake pipe of the internal combustion engine, there is a regeneration valve (likewise not shown) whose opening causes the negative pressure which prevails in the intake pipe to be present at the outlet 26. In order to enable heating of the purging air which is flowing in via the purging air inlet 24 under the action of the negative pressure by means of energizing the actuating magnet of the tank shutoff valve 18, the switching signal for opening the tank shutoff valve 18 can be supplied to the respective valve at the same time as the switching signal for opening of the regeneration valve. For this purpose, the control means 30 can be coupled to an engine control device. First of all, however, the activated charcoal 14 can also be heated by operating the tank shutoff valve 18 as a heating means, and then the regeneration valve can be opened with the tank shutoff valve 18 closed.

FIG. 2 shows another option for arranging the tank shutoff valve 18 which can be operated as a heating means on an activated charcoal filter 10'. In this case, the activated charcoal filter 10' has a receiving space 34 into which the tank shutoff valve 18 can be inserted as a module. When the tank shutoff valve 18 has been inserted into the receiving space 34 and is being operated as a heating means, the energized tank shutoff valve 18 can release heat to the activated charcoal 14 in lateral directions and downward. A line which connects the tank shutoff valve 18 to the inlet 16 can be arranged such that the tank shutoff valve 18 is located upstream of the inlet 16.

The invention claimed is:

1. A filter device for treating gases emanating from the fuel supply means of a motor vehicle, comprising:
    a housing;
    a gas adsorbing, heat actuated medium disposed in said housing;
    a heat emitting valve entirely embedded in and in heat exchange relationship with said medium;
    means for conveying a gas adsorbable by said medium from a housing inlet, through said valve into said medium; and
    means for conveying a purging gas through said medium.

2. The filter device of claim 1 wherein said medium comprises activated charcoal and said adsorbing gas is a hydrocarbon.

3. The filter device of claim 2 wherein said purging gas is air.

4. The filter device of claim 1 wherein said valve is an electromagnetically actuated, bistable valve.

5. The filter device of claim 4 wherein said valve is functionally responsive to an electrical current of a first frequency merely to emit heat and a second frequency to open said valve.

6. The filter device of claim 1 wherein said housing inlet of said adsorbable gas is connectable to the fuel tank of said motor vehicle provided with an internal combustion engine, and said housing includes an outlet connectable to the air intake of said engine.

7. The filter device of claim 6 including means for simultaneously actuating said valve and a second valve disposed in a passageway interconnectable between said housing inlet and said air intake of said engine.

8. The filter device of claim 1 wherein said housing includes a baffle disposed between inlet and outlet ports of said purging gas, functional to provide an elongated flow path of said purging gas injected into and through said medium.

\* \* \* \* \*